May 11, 1937.  G. T. BALFE  2,079,729
GASKET
Filed April 10, 1933　　2 Sheets-Sheet 1
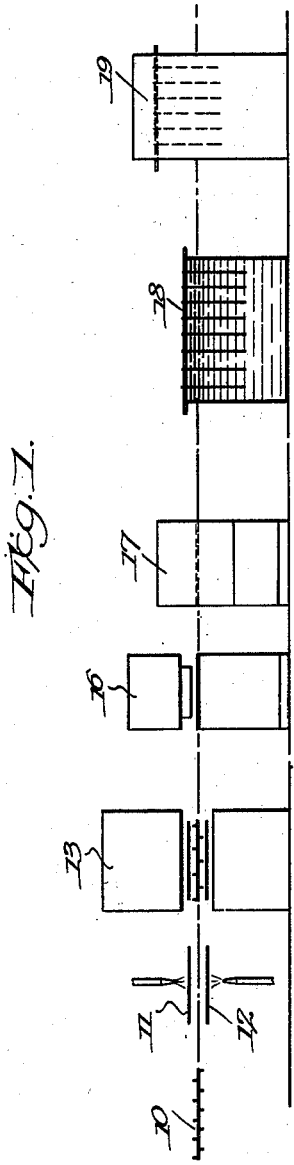
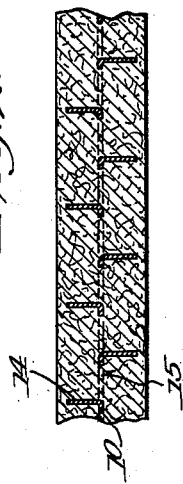
Inventor
George T. Balfe May 11, 1937. G. T. BALFE 2,079,729
GASKET
Filed April 10, 1933 2 Sheets-Sheet 2
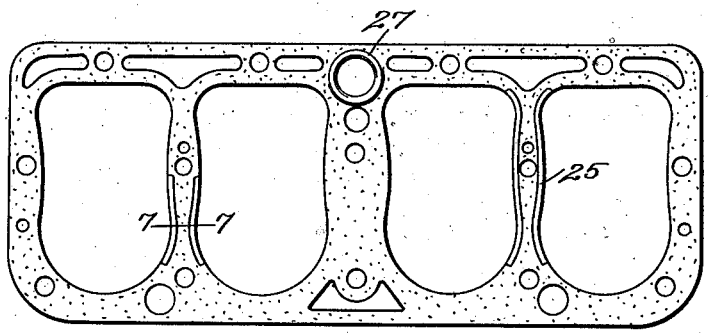
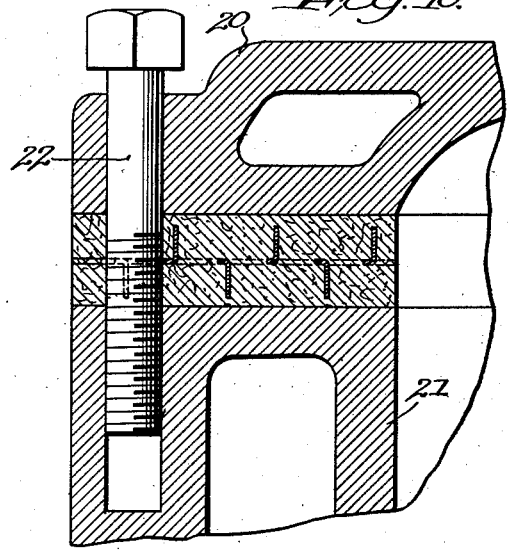
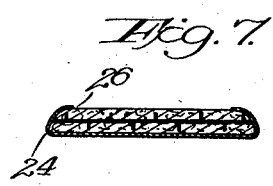
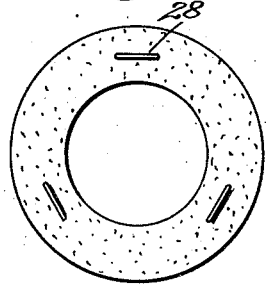
Inventor
George T. Balfe,
By Cushman Darby & Cushman
Attorneys Patented May 11, 1937

2,079,729

UNITED STATES PATENT OFFICE 2,079,729

GASKET

George T. Balfe, Detroit, Mich., assignor to Detroit Gasket & Mfg. Co., Detroit, Mich., a corporation of Michigan Application April 10, 1933, Serial No. 665,457

2 Claims. (Cl. 288—1)

This invention relates to gaskets and a method of manufacturing the same.

The gaskets manufactured in accordance with my issued Patent No. 1,776,140 and my several copending applications and patents are highly satisfactory and the present invention constitutes an improvement upon such gaskets which is particularly useful in certain cases.

I have in mind particularly the provision of a gasket which will produce a maximum seal in extreme cases of warping at the exhaust joint surfaces of internal combustion engines, as well as take care of similar irregularities or a lack of trueness between the head and block of an internal combustion engine.

The present invention is particularly useful in such unusual and difficult occasions and will save much expense which might be required to plane or work the contact surfaces to remove irregularities. Furthermore, where such planing or smoothing is resorted to in the case of the head and block of an internal combustion engine, the size of the combustion chamber is necessarily changed and the compression ratio obviously becomes greater. To overcome these various unsatisfactory conditions, which sometimes occur, the present gasket is highly useful.

The present invention comprises a gasket having a compressible layer or layers and a metal layer provided with narrow deformable and resilient projections which are embedded in the compressible layer by pressure, whereby the two layers are combined into a unit. The considerations to be observed are (1) the thickness of the compressible layers, (2) the length of the projections, and (3) the amount of pressure employed in uniting them whereby the projections are embedded in the compressible layer or layers so that their ends lie below the exposed surface of such layers. In this manner, the gasket may be supplied for various applications and the pressure utilized for securing the contact surfaces together with force the projections through the compressible layers so as to (1) produce barriers throughout the thickness of the gasket and (2) the ends of the metallic insert will be disposed in heat conducting relation or contact with the contact surfaces.

In making a gasket for a particular application, the density of the compressible layer material and the extent of the embedding of the projections therein will be controlled so that when the contact surfaces are secured together, the results above mentioned will be obtained. The pressure exerted by the contact surfaces upon the gasket will necessarily vary in accordance with the application. In the case of exhaust gaskets and cylinder head gaskets this pressure is readily ascertainable so that the gasket will be constructed to accord with the engineering principles of a particular motor, exhaust manifold, or other use.

I am of course aware that it has been suggested to employ grater-like projections or tangs terminating short of the exposed surfaces of the gasket layers. However, in connection with these earlier disclosures, the final article has the projections permanently positioned and the compressible material permanently densified so that when applied between contact surfaces, the pressure which results when such surfaces are secured together, would not force the projections entirely through the compressible layers to form barriers and heat conduits as with the present invention.

It is to be understood that in the original combining operation the narrow and resilient projections are usually slightly deformed and in the final pressure action between contact surfaces, the tangs are forced through the material into contact relation with the contact surfaces and in some cases have their ends bent over and embedded in the surfaces of the compressible layers. In any event, the exposed surface or surfaces of the compressible layers are substantially smooth and unobstructed, forming an efficient sealing surface.

Referring to the drawings,

Figure 1 is a diagrammatic view showing the method by which the gasket is manufactured.

Figures 2 and 3 are sectional views showing the complete gasket.

Figures 4 and 5 are sectional views showing another type of complete gasket.

Figures 6 and 7 are views showing a modification of the gasket.

Figures 8 and 9 are views of another modification.

Figure 10 is a view showing one of the gaskets of Figures 1 to 9 applied between opposed contact surfaces, before such contact surfaces are secured together, the particular application shown being between the block and head of the usual internal combustion engine.

Figure 11 is a view showing the gasket after the block and head have been bolted together.

Referring to the drawings, the numeral 10 indicates a strip of metal insert material of the form shown in my application Serial No. 402,589, filed October 26, 1929, now Patent No. 1,927,450, issued September 19, 1933, or the form shown in my said issued Patent No. 1,776,140, granted September 16, 1930.

The numeral 11 indicates asbestos layers or layers of any other suitable compressible gasket material and applied to the exposed surface of said layers is a film of graphite 12 or other suitable non-sticking material. In some cases, I find it unnecessary to use a non-sticking expedient, relying upon the compactness of the asbestos fibres of the layer whereby they will exhibit no tendency to separate.

The layers of compressible material which are preferably asbestos have incorporated therein a suitable water-proof adhesive as set forth in my issued Patent No. 1,788,041, January 6, 1931, and as further described in my application Serial No. 648,691, filed December 23, 1932, now Patent No. 2,055,471, issued September 29, 1936, and my application Serial No. 506,441, filed January 3, 1931, now Patent No. 1,928,585, issued September 26, 1933.

The layers 11 are applied to the metal insert strip 10, so as to be coextensive therewith and are combined in a suitable roller or other press 13.

The asbestos or compressible layers may be fed from suitable rolls or applied in the form of strips of determined length as set forth in my aforesaid application Serial No. 643,691.

The combined or unitary product produced after the operation of the press 13 is illustrated in Figures 2, 3, 4 and 5.

The metal insert 10 in Figures 2 and 3 is provided with narrow deformable projections 14 after the manner set forth in my said application Serial No. 402,589. These projections are struck-up from the plane metal sheet and extend substantially vertically or at right angles thereto. The metal sheet will be provided with perforations 15 formed by the struck-up metal and the projections will be closely spaced and preferably produced throughout the entire area of the metal sheet. Usually the projections are of triangular shape, but they may have any other suitable contour. The metal is preferably steel of relatively thin gauge and is resilient as are also the narrow projections 14.

In Figures 4 and 5, I have shown similar constructions wherein the metal insert is of the form shown in my issued Patent No. 1,776,140.

It will be understood that in making the constructions shown in Figures 3 and 5, that the insert 10 will be provided with projections on one side only and will be united with a single layer of compressible material such as asbestos.

Referring to Figures 2 to 5, it will be observed that the sheet product obtained from the combining operation at 13 has the projections somewhat deformed by the combining pressure with the ends of the projections 14 terminating below the exposed surface of the compressible layer or layers 11. This is a very important consideration of the present invention. In order to produce a structure of this character, the layers of asbestos or other compressible material are fed to the press 13 of a definite or determined thickness, the projections 14 are of determined length, and a pressure applied to combine the metal and compressible layers such as will properly embed the projections in the compressible material, that is, the pressure employed at the press is controlled, so that (1) the projections are not forced entirely through the compressible layers and are somewhat deformed, and (2) the density of the compressible material in the final article will permit the gasket to be applied between the contact surfaces to be sealed where the further pressure utilized to secure the joint will force the partially deformed projections entirely through to the outer surface of the compressible layers. In some cases, this latter or sealing pressure will be such as to not only force the projections entirely through, but bend them or clench their ends over the compressible layers and embed the ends within the same, so that they lie within the plane of the outer surface of the compressible layers, thereby forming a smooth and compact gasket.

Stated again, thickness and density of the compressible layers, the length of the projections and the combining pressure employed in the roller press 13 are such that the layers will be combined with the insert but the ends of the projections will terminate below the outer surface of the compressible layers, and the density of the compressible layers will be such that upon the application of further pressure such as will be exerted by the sealing or contact surfaces, the projections will pass entirely through the compressible layers as described. In other words, the gaskets shown in Figures 2 to 5 have the projections embedded to such an extent, and the density of the compressible layers controlled in accordance with the determined pressure which will be applied to the gasket when it is positioned between the contact or sealing surfaces. This condition can be very nicely regulated for the different pressures which will be encountered in the application of the article. For example, the sealing pressure between the head and block will vary in accordance with engineering requirements and with different motors. This situation is very carefully and accurately cared for by the present invention, where the gasket is actually constructed to meet the individual requirements of the particular motor.

The material from the press 13 is passed to a suitable punch 16 where the gaskets of desired configuration are punched and then to a stripper 17 when the gaskets are stripped from the blank.

I find it preferable to give the gaskets an immersion treatment in a suitable solution of a water, oil and gasoline, and gas resistant material. This material also has the additional function of being an adhesive for the asbestos fibres and forms a relatively hard, tough outer surface layer or film which will be resistant to deteriorating influences surrounding the handling of the gasket, as well as afford amplified sealing qualities and resistance to blowing and burning. The particular treatment is described in my aforesaid application Serial No. 648,691.

I have found, in some cases, that the necessity for initially incorporating a water-proof adhesive in the asbestos sheets 11 may be eliminated, and this final treatment with a water, oil and gasoline, and gas resistant solution which is also adhesive and produces a hard abrasion resistant protective surface need only be resorted to. Such solution, of course, will coat the surface of the gasket and impregnate the fibres as well.

In this connection, by using sheets of pure asbestos, the fibres of which have been suitably compacted, both the application of the initial waterproof adhesive and the non-sticking agent may be omitted, and the article simply given an immersion treatment as described in my aforesaid application Serial No. 648,691. The compactness of the fibres will give the required density and sealing properties and at the same time the mass will not adhere to the contact surfaces such as those of metal, notwithstanding the presence of heat and pressure. This is very desirable since sticking of the gasket with consequent separation of the surface fibres must be avoided.

From the immersion tank 18, the gaskets are air dried to remove surface moisture and volatiles, such as solvents, and thereupon passed to a suitable baking oven or chamber 19 where any occluded moisture is removed and the chemicals and adhesives employed are cured.

As heretofore explained, the final product is disclosed in Figures 2 to 5, with the exception that I have not illustrated the hard abrasion resistant and protective coating produced by immersion in the tank 18. It will be understood that while I have described this as relatively hard and abrasion resistant, it does not interfere with the compressibility of the gasket material, being flexible and tough.

As heretofore indicated, the gasket which is the final product of this invention is characterized by (1) having the ends of the projections 14 terminating short of the outer or exposed surface of the compressible layer in which such projections are embedded, and (2) the density of the compressible layers is such that when compressed further by the contact surfaces, such projections will pass entirely through the compressible layers and be further deformed or clenched over. The penetration of the projections and density of the compressible layers are correlated in accordance with the different sealing pressures used at the joint where the gasket is to be applied.

In order to prepare a gasket, attention must be directed to the various requirements of the motor manufacturers which in substantially every case are different. For example, in the case of the head and block of an internal combustion engine, some engines require one thickness and others a greater or less thickness when the head is bolted to the block. The present invention enables this requirement to be fully cared for and in particular under those conditions where there is a lack of trueness or other irregularities between the contact surfaces of the head and block. The same conditions are true in the case of the contact surfaces of the exhaust manifold with which the invention has a particular application.

Therefore, it will be observed that the thickness and density of the layers 11, the height of the projections 14 and the combining pressures of the press 13 are carefully controlled, so as to obtain the products of Figures 2 to 5 correlated in each case to accord with the final sealing pressure utilized, i. e., the amount of pressure applied to the contact surfaces to form the desired seal.

In Figure 10, I have illustrated the gasket applied between the head 20 and block 21 of an internal combustion engine which is representative. The gasket of Figure 2 is shown in position before the head is bolted to the block. In Figure 11, the head and block have been bolted as at 22 and the pressure produced by this bolting operation has forced the ends of the projections 14 through the layers 11 and deformed and clenched over their ends as at 23, so that they lie in the plane of the gasket material and a substantially smooth efficient sealing surface is produced.

In some cases the pressure will simply be enough to deform the ends of the projections slightly and force them to the surface of the compressible layers.

It is observed upon reference to Figures 10 and 11 that the density of the compressible material, and the thickness of the compressible material beyond the projections is such that upon application of pressure when the gasket is confined between the contact surfaces, that the compressible material will be compacted and densified and the projections will be forced through to the outer surface of the gasket forming barriers throughout the thickness of the gasket, which barriers are resistant to forces acting transversely of the gasket, i. e., gases and water. Furthermore, the ends of the projections lie in the plane of the outer surface of the gasket, i. e., the compressible material forming heat conducting means and producing a smooth and efficient sealing surface.

It is to be further understood that when the gasket is applied between the head and the block and bolted as shown in Figure 10, that in addition to forcing the projections through the compressible layers and bending or clenching over the ends, that the compressible layers are themselves densified and compacted in a most acceptable manner.

Referring to Figures 6 and 7 I have illustrated a cylinder head gasket provided with a metallic member 24 preferably of sheet steel, as disclosed in my application Serial No. 506,441. This member is bent to embrace exposed edges of the webs 25 of the gasket and overlies the adjacent exposed face portions of the gasket as at 26. This member also will be employed about the bolt holes or water openings as at 27. The reinforcing and densifying member will be either initially compressed upon the gasket or it may be simply laid upon the webs or water holes, and compressed upon the gasket when the same is acted upon by the sealing surfaces of the joint. Where the member is initially compressed upon the gasket, in some cases, the pressure will force the projections through the compressible layers and deform the ends of the projections, at the point of application of the member. In other instances, this pressure will not be sufficient to accomplish the complete penetration of the projections. In any event, the complete penetration and clenching will be accomplished by the final pressure exerted by the sealing or contact surfaces. It is to be understood that the metallic member will preferably be compressed either initially or by the sealing pressure so as to lie substantially flush with the adjacent surface portions of the gasket, whereby not only are the projections caused to extend entirely through the compressible layers and be clenched over, but moreover the density or compactness of the compressible material is increased and thereby strengthened at the points of greatest wear.

In Figures 8 and 9 I have shown two or more of the gaskets of Figures 2, 3, 4, 5 and 6 superposed and stitched together at spaced points as shown at 28. This stitching may be continuous if desired, and preferably metallic stitches of suitable thin wire 29 are employed as shown in Figure 9. When the laminated gasket of the type shown in Figures 8 and 9 is applied to the sealing surfaces, for example of an exhaust manifold, the pressure exerted by the sealing pressure upon the gasket will produce the several results herein described, and in addition the exposed portions of the wire stitches on the surfaces of the gasket will be compressed into the gasket material so that a smooth substantially unobstructed sealing surface is produced.

I claim:

1. A gasket having a smooth contact surface and comprising a layer of compressible material and a metal layer, said metal layer having closely compacted projections embedded in said compressible material layer by pressure and having their ends terminating below and covered by the exposed surface of the compressible material layer to provide a continuous plane of compressible material devoid of projections to fill and seal irregularities in the joint surface, the compressible material being of a density and the portion beyond the projections being of a thickness that upon application of pressure when the gasket is confined between plane joint surfaces, the compressible material will be compacted and densified and the projections will be forced through to the outer surface of the gasket forming barriers throughout the thickness of the gasket to forces acting transversely thereof.

2. A gasket having a smooth contact surface and comprising layers of compressible material and a metal layer therebetween, said metal layer having closely compacted projections embedded in said compressible material layers by pressure and having their ends terminating below and covered by the exposed surface of the compressible material layer to provide continuous planes of compressible material devoid of projections to fill and seal irregularities in the joint surfaces, the compressible material being of a density and the portion beyond the projections being of a thickness that upon application of pressure when the gasket is confined between plane joint surfaces, the compressible material will be compacted and densified and the projections will be forced through to the outer surface of the gasket forming barriers throughout the thickness of the gasket to forces acting transversely thereof.

GEORGE T. BALFE.